US005151680A

United States Patent [19]

Yamasaki

[11] Patent Number: 5,151,680

[45] Date of Patent: Sep. 29, 1992

[54] SPEAKER DRIVER

[75] Inventor: Koji Yamasaki, Tokyo, Japan

[73] Assignee: NEC Corporation, Tokyo, Japan

[21] Appl. No.: 692,771

[22] Filed: Apr. 26, 1991

Related U.S. Application Data

[63] Continuation of Ser. No. 414,644, Sep. 27, 1989, abandoned, which is a continuation of Ser. No. 150,618, Feb. 1, 1988, abandoned.

[30] Foreign Application Priority Data

Feb. 5, 1987 [JP] Japan ................................ 62-25210

[51] Int. Cl.[5] ................................................ H04B 1/16

[52] U.S. Cl. ............................ 340/384 E; 340/311.1; 340/825.44

[58] Field of Search ............ 340/311.1, 384 E, 384 R, 340/693, 825.44; 320/39, 13; 330/257; 381/120, 124; 455/343

[56] References Cited

U.S. PATENT DOCUMENTS 4,054,869 10/1977 Smith et al. .................... 340/384 E
4,183,020 1/1980 Schade, Jr. ................ 340/384 E X
4,210,855 7/1980 Harer et al. ......................... 320/13
4,308,609 12/1981 Tamaki .......................... 320/130 X
4,755,816 7/1985 DeLuca ......................... 340/825.44

*Primary Examiner*—Jin F. Ng
*Assistant Examiner*—Brian R. Tumm
*Attorney, Agent, or Firm*—Laff, Whitesel, Conte & Saret

[57] ABSTRACT

A speaker driver is operated by a battery and drives a speaker to generate an alert tone in response to an externally input intermittent signal. The speaker driver includes a reference voltage generator for generating a reference voltage, a transconductance amplifier for outputting a current corresponding to a differential voltage between a voltage of the battery and the reference voltage, an output control switch for ON/OFF-controlling the output current from the transconductance amplifier in accordance with the intermittent signal, and a DC amplifier for amplifying the ON/OFF-controlled output current as a driving current for the speaker. Since a speaker driving current is decreased as a power source voltage is dropped, an abnormal voltage drop during an alert generation period can be prevented, thereby prolonging the service life of a battery.

19 Claims, 4 Drawing Sheets

SPEAKER DRIVER

This application is a continuation of application Ser. No. 07/414,644, filed Sep. 27, 1989, now abandoned, which was a continuation of application Ser. No. 07/150,618, filed Feb. 1, 1988, now abandoned.

BACKGROUND OF THE INVENTION

The present invention relates to a speaker driver and, more particularly, to a speaker driver used in a paging receiver or a pager operated by a battery.

FIG. 1 shows a general arrangement of a pager operated by a battery. This pager comprises a receiving circuit 205 for receiving a radio paging signal, an ID ROM 207 for storing a self-identification number (ID), a display 208 for displaying a destination telephone number or a message, a speaker 202 for generating an alert tone, a speaker driver 201 for driving the speaker 202, a decoder 206 for detecting the self-identification number in response to outputs from the receiving circuit 205 and the ID ROM 207 and supplying a display instruction to the display 208 while supplying an alert tone generation instruction to the speaker driver 201, and a DC/DC converter 209 for receiving power from a battery 203 having an internal resistor 204 and supplying a DC current to each part such as the decoder 206 excepting the speaker driver 201 and the speaker 202.

The speaker driver 201 for receiving power from the battery 203 parallelly with the DC/DC converter 209 is constituted by cascade connecting three transistors $Q_1$, $Q_2$ and $Q_3$. The speaker 202 serves as a load of an output transistor Q3.

When the input transistor $Q_1$ is ON/OFF-operated in response to an alert tone generation instruction from the decoder 206, the speaker 202 generates a sound corresponding to a repeating frequency of the ON/OFF operation.

Note that the alert tone generation instruction from the decoder 206 has a rectangular waveform having a frequency of several kHz, and a plurality of such instructions are output at predetermined intervals.

In the speaker driver 201 in FIG. 1, a voltage $V_B$ at a point 210 during a speaker drive mode, i.e., when an alert tone is generated, is varied in accordance with consumption of a current such as a speaker driving current and a voltage drop $V_{DROP}$ across the internal resistor 204 of the battery 203.

A current consumed when an alert tone is generated is large and is not significantly decreased even if a power source voltage is dropped. However, since the resistance of the internal resistor 204 of the battery 203 is increased as the battery capacitance is decreased, the voltage drop $V_{DROP}$ tends to be increased.

FIG. 2 shows the voltage $V_B$. The level of the voltage $V_B$ is dropped in every alert tone generation period indicated by S. Finally, a voltage obtained by subtracting the voltage drop $V_{DROP}$ from the voltage $V_B$ is decreased to a level below a minimum operation voltage $V_{MIN}$, which is a minimum value of the power source voltage required for assuring the operation of the DC/DC converter 209 or the receiving circuit 205.

In other words, in a conventional pager using the speaker driver 201, the battery must be replaced with a new one when the voltage $V_B = V_{MIN} + V_{DROP}$. Theoretically, a battery can be used until its voltage value is decreased to the minimum operation voltage $V_{MIN}$. In practice, however, a battery replacement time becomes earlier by a time corresponding to the voltage drop $V_{DROP}$.

The conventional pager will be explained with reference to an example. The minimum operation voltage $V_{MIN}$ in a pager of this type is set at 1.0 V. Generally, the voltage drop $V_{DROP}$ is about 0.2 V. A battery replacement voltage becomes 1.2 V.

FIG. 3 shows a discharge characteristic of a SUM-3P battery. The terminal voltage becomes 1.2 V in about 41 hours, and 1.0 V in about 56 hours. The service life of the battery is shorter by about 15 hours than it should be.

In a pager of this type using a battery, the service life is an important parameter determining a commercial value of the apparatus, thereby posing a serious problem.

SUMMARY OF THE INVENTION

It is an object of the present invention to provide a speaker driver which is used in a pager operated by a battery and which can prolong a service life of the battery.

The speaker driver according to the present invention, operated by a battery, for driving a speaker to generate an alert tone in response to an externally input intermittent signal, comprises a reference voltage generator for generating a reference voltage, a transconductance amplifier for outputting a current corresponding to a differential voltage between a voltage of the battery and the reference voltage, an output control switch for ON/OFF-controlling the output current from the transconductance amplifier in accordance with the intermittent signal, and a DC amplifier for amplifying the ON/OFF-controlled output current as a driving current for the speaker.

DETAILED DESCRIPTION OF THE PREFERRED EMBODIMENT

An embodiment of the present invention will be described below with reference to the accompanying drawings.

Figure 1:
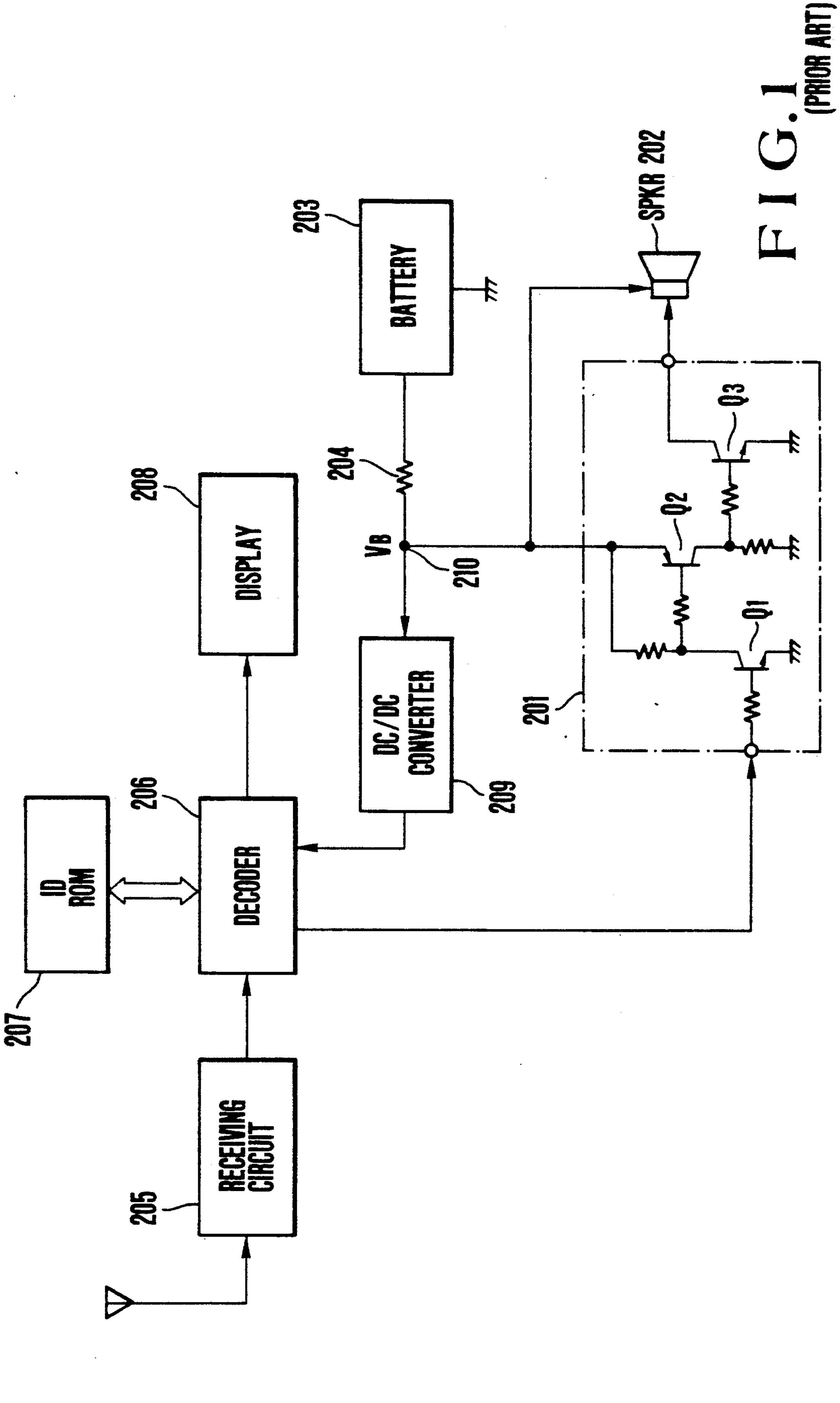
FIG. 1 (PRIOR ART)
FIG. 1 is a block diagram showing an arrangement of a pager including a conventional speaker driver.
Figure 2:
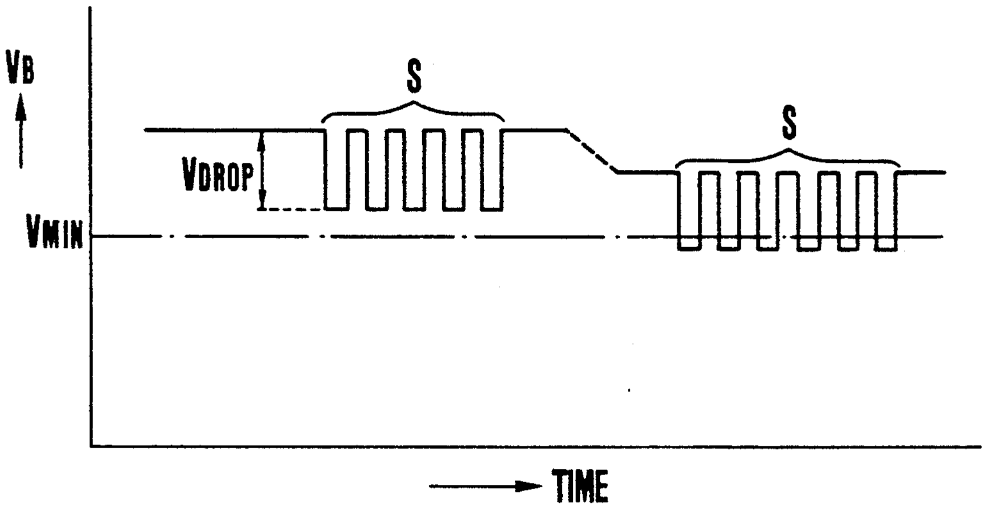
FIG.2 (PRIOR ART)
FIG. 2 is a timing chart showing a waveform of a power source voltage for explaining an operation of the speaker driver in FIG. 3 is a graph for explaining a drawback of the conventional speaker driver.
Figure 3:
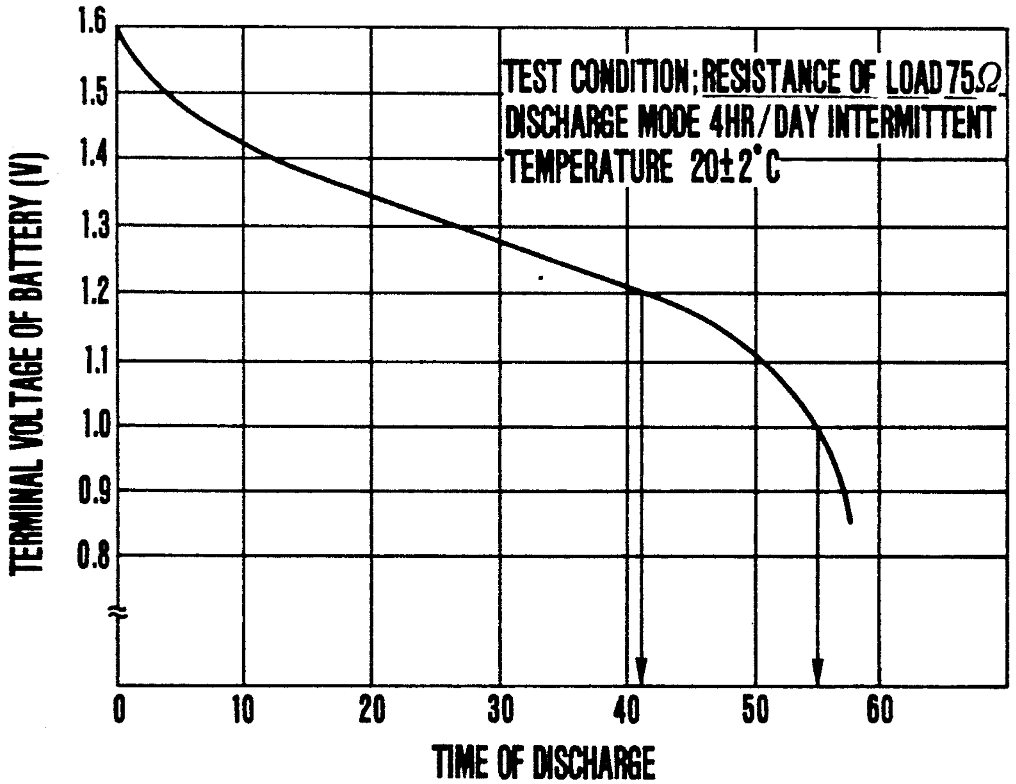
FIG.3 (PRIOR ART)
Figure 4:
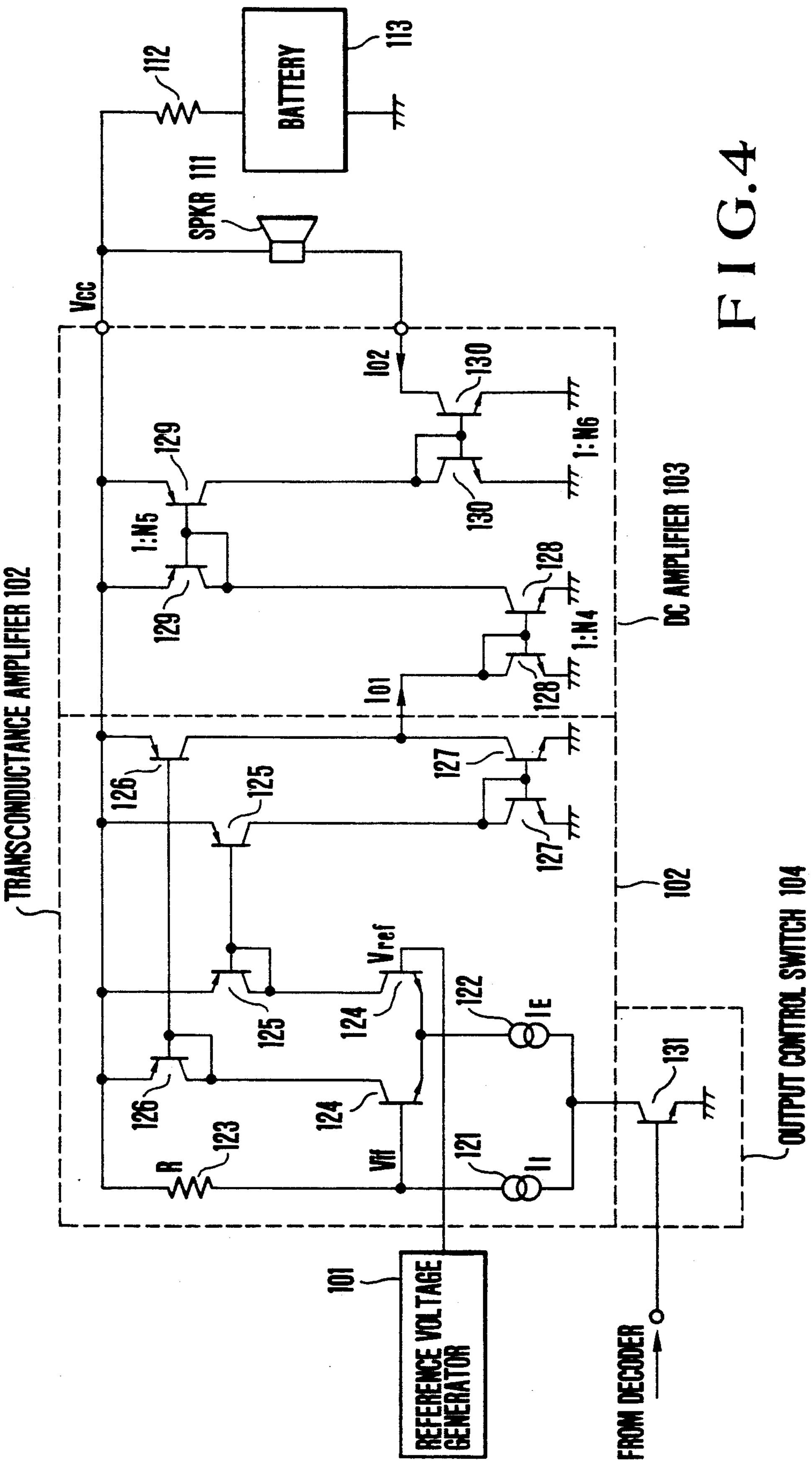
FIG. 4 is a block diagram of a speaker driver according to the present invention.

FIG. 4 shows a speaker driver according to the embodiment of the present invention. The speaker driver comprises a reference voltage generator 101, a voltage/current converter or transconductance amplifier 102, an output control switch 104, and a DC amplifier 103.

In this embodiment, the transconductance amplifier 102, the output control switch 104, and the DC amplifier are integrated. A speaker 111 as a load is connected to the DC amplifier 103. A battery 113 having an internal resistor 112 serves as an operation power source.

The transconductance amplifier 102 comprises a resistor 123 having a resistance R, constant current sources 121 and 122 respectively having output current values $I_1$ and $I_E$, a differential transistor pair 124, and current mirrors 125, 126, and 127. A reference voltage $V_{ref}$ from the reference voltage generator 101 is applied to the base of one transistor of the differential transistor pair 124, whereas a voltage $V_{if}$ obtained by subtracting a voltage drop $I_1 \cdot R$ across the resistor 123 from a power source voltage $V_{cc}$ is applied to the base of the other transistor of the differential transistor pair 124.

The output terminals of the constant current sources 121 and 122 are commonly connected to the collector of a switching transistor 131 of the output control switch 104. An alert tone generation instruction, which is an externally input intermittent signal, is supplied from a decoder of the pager to the base of the switching transistor 131. The switching transistor 131 is operated in response to the alert tone generation instruction. As a result, an output current $I_{01}$ supplied from the current mirror 127 to the DC amplifier 103 is ON/OFF-controlled in accordance with the alert tone generation instruction. In this case, the output current $I_{01}$ is given by the following equation (1) according to general characteristics of the transconductance amplifier 102.

$$I_{01} = I_E \cdot \tanh \frac{V_{id}}{2V_T} \quad (1)$$

for $V_T = KT/q$ (K is a Boltzmann's constant, T is the absolute temperature, and q is the electric charge of an electron). Note that $V_{id}$ is a base-to-base voltage of the differential transistor pair 124 and is given by:

$$V_{id} = V_{if} - V_{ref} = V_{cc} - I_1 \cdot R - V_{ref} \quad (2)$$

Therefore, equation (1) is rewritten as:

$$I_{01} = I_E \cdot \tanh \frac{V_{cc} - I_1 \cdot R - V_{ref}}{2V_T} \quad (3)$$

The DC amplifier 103 comprises current mirrors 128, 129, and 130 respectively having emitter size ratios of $1:N_4$, $1:N_5$, and $1:N_6$. The DC amplifier amplifies the input current $I_{01}$ to obtain a speaker driving current $I_{02}$ for the speaker 111.

If a maximum capacity of the speaker driving current $I_{02}$ is $I_{02(MAX)}$, it is given by:

$$\begin{aligned} I_{02(MAX)} &= N_4 \cdot N_5 \cdot N_6 \cdot I_{01} \\ &= N \cdot I_E \cdot \tanh \frac{V_{cc} - I_1 \cdot R - V_{ref}}{2V_T} \end{aligned} \quad (4)$$

for $N = N_4 \cdot N_5 \cdot N_6$.

Therefore, if a minimum operation voltage of the pager is $V_{MIN}$ and $V_{MIN} = V_{ref} + I_1 R$, equation (4) is rewritten as:

$$I_{02(MAX)} = N \cdot I_E \cdot \tanh \frac{V_{cc} - V_{MIN}}{2V_T} \quad (5)$$

Then, the changes in $I_{02(MAX)}$ in accordance with the changes in $V_{cc} - V_{MIN}$ can be represented by the following numerical values:

$$I_{02(MAX)} \approx N \cdot I_E \text{ for } V_{cc} - V_{MIN} \geqq 3\, V_T \approx 75 \text{ mV}$$
$$I_{02(MAX)} \approx 0.8 \cdot N \cdot I_E \text{ for } V_{cc} - V_{MIN} \geqq 2\, V_T \approx 50 \text{ mV}$$
$$I_{02(MAX)} \approx 0.5 \cdot N \cdot I_E \text{ for } V_{cc} - V_{MIN} \geqq 1\, V_T \approx 25 \text{ mV}$$

-continued $$I_{02(MAX)} \approx 0.2 \cdot N \cdot I_E \text{ for } V_{cc} - V_{MIN} \geqq 0.5\, V_T \approx 13 \text{ mV}$$
$$I_{02(MAX)} = 0 \text{ for } V_{cc} - V_{MIN} = 0$$

In other words, as the power source voltage $V_{cc}$ is dropped, the maximum capacity $I_{02(MAX)}$ of the speaker driving current $I_{02}$ is gradually decreased. If the power source voltage $V_{cc}$ is dropped to the minimum operation voltage $V_{MIN}$, capacity $I_{02(MAX)}$ becomes zero.

Figure 5:
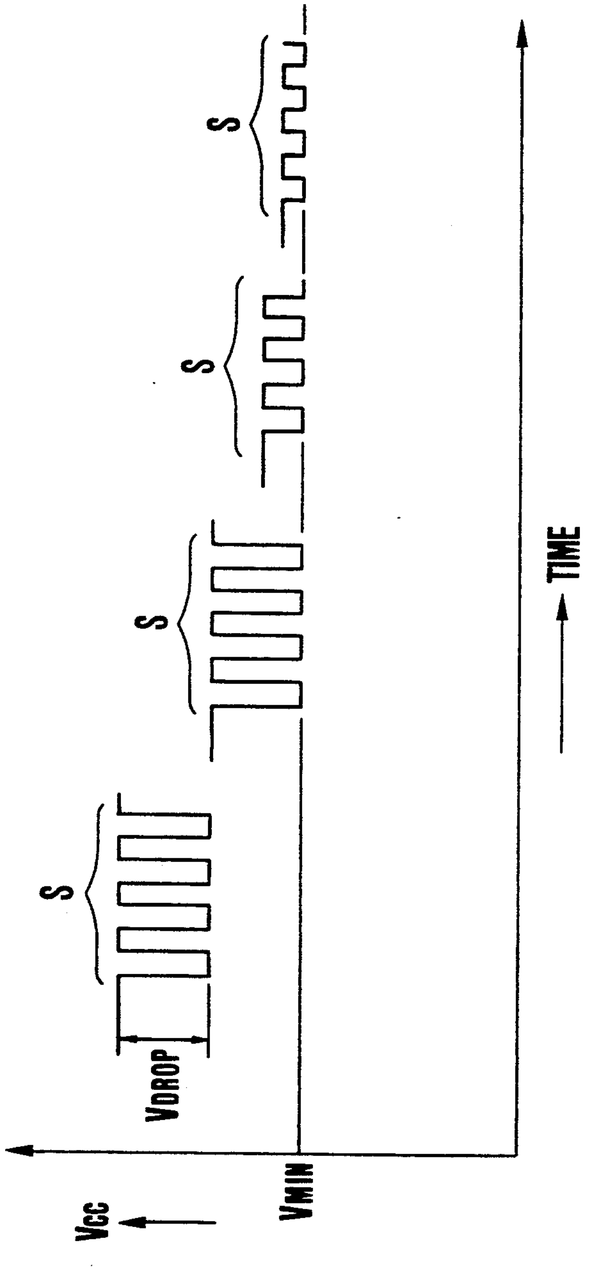
FIG. 5 is a timing chart showing a waveform of a power source voltage for explaining an operation of the speaker driver in FIG. 4.

As shown in FIG. 5, the speaker driver according to the present invention is operated such that the power source voltage $V_{cc}$ during the alert tone generation mode is always kept at the minimum operation voltage $V_{MIN}$ or more. The battery 113 can be used until its voltage is dropped close to the minimum operation voltage $V_{MIN}$. Therefore, the service life of a battery can be greatly prolonged compared with that in the conventional speaker driver.

In the above-described embodiment, the integrated circuit arrangement is exemplified. However, a speaker driver having the same functions can be arranged by discrete parts.

As has been described above, according to the speaker driver of the present invention, since the speaker driving current is decreased as the power source voltage is dropped, an abnormal voltage drop during the alert tone generation period as in the conventional speaker driver can be prevented.

Therefore, in the pager using the speaker driver of the present invention, since the power source voltage during the alert tone generation period is not dropped below the minimum operation voltage of the pager, the service life of a battery can be prolonged, thereby greatly prolonging the battery replacement period, i.e., the usable period of the battery.

What is claimed is:

1. A speaker driver, operated by a battery, for driving a speaker to generate an alert tone in response to an externally output intermittent signal, said driver comprising:

a reference voltage generator for generating a reference voltage;

a transconductance amplifier for outputting a current corresponding to a differential voltage between a voltage of said battery and the reference voltage;

said transconductance amplifier comprising a series circuit of a resistor connected between said battery and said output control switch and a first constant current source, a differential transistor pair, bases of transistors of which are respectively connected to an output of said reference voltage generator and a point between said resistor and said first constant current source, emitters of both said transistors being connected to said output control switch through a second constant current source, first and second current mirrors, one transistor of each of which is connected between each transistor of said differential transistor pair and said battery, and a third current mirror consisting of transistors, each of which is series-connected to the other transistor of each of said first and second current mirrors between said battery and ground; and an output from said transconductance amplifier being obtained at a point between said second and third current mirrors;

an output control switch for ON/OFF-controlling the output current from said transconductance amplifier in accordance with the intermittent signal; and a DC amplifier for amplifying the ON/OFF-controlled output current as a driving current for said speaker.

2. A speaker drive operated by a battery, for driving a speaker to generate an alert tone in response to an external output intermittent signal, said driver comprising:

a reference voltage generator for generating a predetermined reference voltage which corresponds to an operable voltage of an electronic circuit operated by said battery, said electronic circuit comprising a decoder;

a transconductance amplifier means for outputting a current corresponding to a differential voltage between a voltage of said battery and the predetermined reference voltage;

an output control switch for ON/OFF-controlling the output current from said transconductance amplifier means in accordance with the intermittent signal;

said transconductance amplifier means comprising a series circuit of a resistor connected between said battery and said output control switch and a first constant current source, a differential transistor pair, bases of transistors of which are respectively connected to an output of said reference voltage generator and a point between said resistor and said first constant current source, emitters of both of said transistors being connected to said output control switch through a second constant current source, first and second current mirrors, one transistor of each of said current mirrors being connected between each transistor of said differential transistor pair and said battery, and a third current mirror consisting of transistors, each of which transistors is series-connected to the other transistor of each of said first and second current mirrors between said battery and ground; an output from said transconductance amplifier means being obtained at a point between said second and third current mirrors;

a DC amplifier for amplifying the ON/OFF-controlled output current as a driving current for said speaker.

3. A speaker driver according to claim 2, wherein said DC amplifier comprises a fourth current mirror having an emitter size ratio of $1:N_4$ and connected between an output terminal of said transconductance amplifier and ground, a fifth current mirror having an emitter size ratio of $1:N_5$ and connected to said battery and said fourth current mirror, and a sixth current mirror having an emitter size ratio of $1:N_6$ and connected between said fifth current mirror and ground; and said speaker is connected between said battery and said sixth current mirror.

4. A power saving circuit for a battery powered pager, said circuit comprising a battery, a reference voltage generator which generates a voltage signal corresponding to a minimum operating voltage for said pager, converter means for generating a current signal corresponding to a voltage difference between the reference voltage and the voltage of said battery, a loud speaker for giving a pager alert tone, and supply means responsive to said current signal from said converter means for supplying a speaker drive current to said lou speaker to control a speaker drive voltage applied thereto from said battery, said supply means reducing said speaker drive voltage as said current signal reflects any drop in battery voltage while maintaining at least said minimum operating voltage for said pager.

5. The power saving circuit of claim 4 wherein said pager is identified by an encoded signal, and means responsive to a receipt of said encoded signal for activating said converter means.

6. A power saving circuit according to claim 4, wherein said converter means comprises a transconductance amplifier.

7. A power saving circuit according to claim 6 wherein said pager comprises a decoder.

8. A selective call radio paging receiver with a battery saving function comprising:

battery means for supplying a voltage and current necessary to operate circuitry of said receiver;

said circuitry comprising receiving means for receiving a paging signal in order to produce received pages;

decoder means coupled to said receiving means for decoding and detecting the received pages in order to produce a detect signal;

annunciator means responsive to said detect signal for producing an alert signal to annunciate the reception of a page; and current control means for reducing current from said battery means to said annunciator means in response to a drop in an operable voltage of said battery means before said operable voltage reaches a predetermined reference voltage level which is representative of a minimum operating voltage required for the receiver and stopping said current from said battery means to said annunciator means when said operable voltage reaches said predetermined reference voltage.

9. A receiver as claimed in claim 8, wherein said current control means comprises means for supplying current to said annunciator means when said decoder means detects the received page.

10. A receiver as claimed in claim 8, wherein said current control means comprises:

means for determining if the operable voltage falls below said predetermined reference voltage;

means responsive to the output of said determining means for amplifying said current from said battery means to said annunciator means;

means for supplying the amplified current to said annunciator means when said decoder means detects the received page; and means for stopping the supply of said current to said annunciator means if said operable voltage falls below said predetermined reference voltage.

11. A receiver as claimed in claim 10, wherein said determining means includes a difference amplifier for determining if said operable voltage falls below said predetermined reference voltage and wherein said amplifying means comprises a current mirror circuit responsive to the output of said difference amplifier for supplying the current from said battery means to said annunciator means.

12. A receiver as claimed in claim 10, wherein said annunciator means includes an audio transducer for producing an audible alerting signal as said alert signal in response to said detect signal.

13. A speaker driver operated by a battery, for diving a speaker to generate an alert tone in response to an externally output intermittent signal, said driver comprising:

a reference voltage generator for generating a predetermined reference voltage which corresponds to an operable voltage of an electronic circuit operated by said battery;

a transconductance amplifier means for outputting a current corresponding to a differential voltage between a voltage of said battery and the predetermined reference voltage;

an output control switch for ON/OFF-controlling the output current form said transconductance amplifier means in accordance with the intermittent signal;

a DC amplifier for amplifying the ON/OFF-controlled output current as a driving current for said speaker, said DC amplifier comprising a first current mirror having an emitter size ratio of $1:N_4$ and being connected between an output terminal of said transconductance amplifier and ground, a second current mirror having an emitter size ratio of $1:N_5$ and being connected to said battery and said first current mirror, and a third current mirror having an emitter size ratio of $1:N_6$ and being connected between said second current mirror and ground; and said speaker being connected between said battery and said third current mirror.

14. A battery-power device comprising:

a first circuit;

a second circuit;

battery means for supplying power to said first and second circuits;

means for providing a reference voltage which is representative of a minimum operating voltage for said first circuit;

means for comparing the voltage of said battery means and said reference voltage to produce a control signal which is indicative of the comparison result; and means responsive to said control signal for reducing a current form said battery means to said second circuit and stopping the supply of said current to said second circuit when said control signal indicates that the voltage of said battery means falls below said reference voltage.

15. A device as claimed in claim 14, wherein said first circuit comprises receiver means for receiving and detecting a page to produce a detect signal; and wherein said second circuit comprises annunciator means responsive to said detect signal for annunciating the reception of said page.

16. A device as claimed in claim 15, wherein said annunciator means comprises loudspeaker means coupled responsive to said detect signal for generating an audible alert tone.

17. A method of controlling an output level of a loudspeaker in a personal pager for giving an alerting tone, said method comprising the steps of:

(a) providing a source of battery voltage;

(b) providing a voltage reference signal which corresponds to a minimum acceptable battery voltage for operating said pager, (c) comparing the battery voltage of step (a) with the voltage reference signal f step (b) and providing a driving signal representing a difference between the compared voltages, (d) supplying a driving voltage from said source of battery voltage to said loudspeaker; and (e) reducing said driving voltage in response to said driving signal while maintaining at least said minimum acceptable battery voltage.

18. The method of claim 17 and the added steps of identifying said pager by an encoded signal, and activating said comparison of step (c) responsive to a receipt of an encoded signal identifying the pager having said loud speaker.

19. A method according to claim 17, further comprising the step of activating said comparison of step (c) in response to an intermittent alert signal provided from a decoder of said pager.

* * * * *